(12) United States Patent
Baker et al.

(10) Patent No.: US 8,769,517 B2
(45) Date of Patent: Jul. 1, 2014

(54) GENERATING A COMMON SYMBOL TABLE FOR SYMBOLS OF INDEPENDENT APPLICATIONS

(75) Inventors: Barry M. Baker, Fishkill, NY (US); Robert O. Dryfoos, Hopewell Junction, NY (US); Daniel S. Gritter, Poughkeepsie, NY (US); Colette A. Manoni, Brewster, NY (US); Sunil Shenoi, Torrington, CT (US); Gerald B. Strait, Salt Point, NY (US); Yuk S. Tam, Astoria, NY (US); Mei-Hui Wang, Brookfield, CT (US)

(73) Assignee: International Business Machines Corporation, Armonk, NY (US)

( * ) Notice: Subject to any disclaimer, the term of this patent is extended or adjusted under 35 U.S.C. 154(b) by 1390 days.

(21) Appl. No.: 10/099,508

(22) Filed: Mar. 15, 2002

(65) Prior Publication Data

US 2003/0177420 A1 Sep. 18, 2003

(51) Int. Cl.
  *G06F 9/44* (2006.01)
  *G06F 9/45* (2006.01)

(52) U.S. Cl.
  USPC .......................................... 717/164; 717/140

(58) Field of Classification Search
  USPC ............. 717/124, 140, 162–164; 714/48, 100
  See application file for complete search history.

(56) References Cited

U.S. PATENT DOCUMENTS

| | | | |
|---|---|---|---|
| 4,636,940 A | 1/1987 | Goodwin, Jr. ................. | 364/200 |
| 4,954,942 A | 9/1990 | Masuda et al. | |
| 5,170,465 A | 12/1992 | McKeeman et al. .......... | 395/700 |
| 5,182,806 A | 1/1993 | McKeeman et al. .......... | 395/700 |
| 5,182,807 A * | 1/1993 | Mizuse et al. ................. | 717/122 |
| 5,193,191 A | 3/1993 | McKeeman et al. .......... | 395/700 |
| 5,278,961 A | 1/1994 | Mueller | |
| 5,278,962 A | 1/1994 | Masuda et al. | |
| 5,291,601 A * | 3/1994 | Sands ............................ | 719/331 |
| 5,325,531 A * | 6/1994 | McKeeman et al. .......... | 717/145 |
| 5,386,522 A | 1/1995 | Evans | |
| 5,408,650 A * | 4/1995 | Arsenault ...................... | 717/124 |
| 5,408,665 A * | 4/1995 | Fitzgerald ..................... | 717/163 |
| 5,555,412 A | 9/1996 | Besaw et al. | |

(Continued)

FOREIGN PATENT DOCUMENTS

| | | | |
|---|---|---|---|
| JP | 62113244 A | 5/1987 | |
| JP | 5334096 | 12/1993 | |
| JP | 10254710 A | 9/1998 | |
| JP | 10289109 A | 10/1998 | ................ G06F 9/45 |

OTHER PUBLICATIONS

Bradley et al. "JAZZ: an efficient compressed format for Java archive files", 1998, IBM Centre for Advanced Studies Conference.*

(Continued)

*Primary Examiner* — Jason Mitchell
(74) *Attorney, Agent, or Firm* — Steven Chiu, Esq.; Blanche E. Schiller, Esq.; Heslin Rothenberg Farley & Mesiti P.C.

(57) ABSTRACT

A common symbol table is generated, which includes symbols of a plurality of independent applications. The symbols included in the common symbol table are common symbols of the applications. The bulky information associated with the common symbols are stored in the common symbol table, and stubs used to locate the common symbols are stored in local tables of the applications.

21 Claims, 6 Drawing Sheets

(56) References Cited

U.S. PATENT DOCUMENTS

| | | | | |
|---|---|---|---|---|
| 5,555,419 A * | 9/1996 | Arsenault | | 717/136 |
| 5,560,009 A | 9/1996 | Lenkov et al. | | |
| 5,594,903 A * | 1/1997 | Bunnell et al. | | 717/162 |
| 5,651,111 A * | 7/1997 | McKeeman et al. | | 714/38.1 |
| 5,655,073 A * | 8/1997 | Nishikado et al. | | 717/124 |
| 5,659,751 A * | 8/1997 | Heninger | | 719/332 |
| 5,680,622 A | 10/1997 | Even | | 395/709 |
| 5,689,684 A | 11/1997 | Mulchandani et al. | | |
| 5,715,460 A | 2/1998 | Acker et al. | | 395/705 |
| 5,727,147 A | 3/1998 | van Hoff | | |
| 5,764,989 A * | 6/1998 | Gustafsson et al. | | 717/129 |
| 5,771,385 A | 6/1998 | Harper | | |
| 5,778,231 A | 7/1998 | van Hoff et al. | | |
| 5,838,975 A | 11/1998 | Abramson et al. | | |
| 5,848,274 A * | 12/1998 | Hamby et al. | | 717/153 |
| 5,860,138 A | 1/1999 | Engebretsen et al. | | |
| 5,892,941 A | 4/1999 | Khan et al. | | |
| 5,923,882 A * | 7/1999 | Ho et al. | | 717/147 |
| 5,950,008 A | 9/1999 | van Hoff | | |
| 5,956,512 A | 9/1999 | Simmons et al. | | |
| 5,987,249 A * | 11/1999 | Grossman et al. | | 717/130 |
| 5,987,256 A * | 11/1999 | Wu et al. | | 717/146 |
| 6,021,272 A * | 2/2000 | Cahill et al. | | 717/147 |
| 6,026,242 A | 2/2000 | Chessin et al. | | 395/709 |
| 6,029,207 A * | 2/2000 | Heninger | | 719/331 |
| 6,067,413 A * | 5/2000 | Gustafsson et al. | | 717/114 |
| 6,067,641 A | 5/2000 | McInerney et al. | | |
| 6,101,325 A | 8/2000 | Flaat | | 395/705 |
| 6,178,548 B1 | 1/2001 | Hickman et al. | | |
| 6,226,786 B1 | 5/2001 | Hickman et al. | | 717/4 |
| 6,256,777 B1 | 7/2001 | Ackerman | | |
| 6,286,104 B1 * | 9/2001 | Buhle et al. | | 726/4 |
| 6,298,481 B1 | 10/2001 | Kosaka et al. | | |
| 6,308,317 B1 * | 10/2001 | Wilkinson et al. | | 717/139 |
| 6,324,683 B1 * | 11/2001 | Fuh et al. | | 717/124 |
| 6,412,106 B1 * | 6/2002 | Leask et al. | | 717/124 |
| 6,434,742 B1 | 8/2002 | Koepele, Jr. | | |
| 6,754,891 B1 | 6/2004 | Snyder et al. | | |
| 6,795,962 B1 * | 9/2004 | Hanson | | 717/129 |
| 6,804,813 B1 * | 10/2004 | Willems et al. | | 717/125 |
| 6,810,519 B1 * | 10/2004 | Hicks | | 717/166 |
| 6,813,762 B1 * | 11/2004 | Plaxton | | 717/148 |
| 6,829,760 B1 * | 12/2004 | Bera | | 717/142 |
| 6,941,492 B1 * | 9/2005 | Ezra et al. | | 714/38 |
| 6,957,419 B2 | 10/2005 | Baker et al. | | |
| 7,065,754 B1 * | 6/2006 | Coutant et al. | | 717/146 |
| 2002/0129336 A1 * | 9/2002 | Bolding et al. | | 717/124 |
| 2003/0074656 A1 * | 4/2003 | Irino | | 717/162 |
| 2003/0088865 A1 * | 5/2003 | Lim et al. | | 717/167 |
| 2003/0177419 A1 * | 9/2003 | Baker et al. | | 714/48 |
| 2003/0177421 A1 * | 9/2003 | Baker et al. | | 714/48 |
| 2003/0226134 A1 * | 12/2003 | Sethi et al. | | 717/147 |
| 2004/0015852 A1 * | 1/2004 | Swetland | | 717/118 |
| 2004/0181648 A1 * | 9/2004 | Jacobs et al. | | 712/24 |
| 2004/0205728 A1 * | 10/2004 | Hanson | | 717/129 |
| 2005/0026130 A1 * | 2/2005 | Crowhurst et al. | | 434/362 |
| 2005/0097533 A1 * | 5/2005 | Chakrabarti et al. | | 717/144 |
| 2005/0210275 A1 * | 9/2005 | Homing et al. | | 713/190 |
| 2006/0069970 A1 * | 3/2006 | Bowers | | 714/724 |
| 2006/0107254 A1 * | 5/2006 | Bowers | | 717/124 |

OTHER PUBLICATIONS

"Diagnosing Java code: The case for static types" posted Jun. 1, 2002 at http://www-128.ibm.com/developerworks/library/j-diag0625.html.*

Levine, "Linkers & Loaders", 1999, Academic Press, pp. 10-11.*

Office Action for U.S. Appl. No. 10/099,849, dated Jan. 10, 2005, pp. 1-19.

Office Action for U.S. Appl. No. 10/099,286, dated Feb. 28, 2005, pp. 1-16.

Office Action for U.S. Appl. No. 10/099,286, dated Mar. 7, 2006, pp. 1-24.

Office Action for U.S. Appl. No. 10/099,286, dated Sep. 11, 2006, pp. 1-27.

* cited by examiner fig. 1A fig. 1B fig. 3A fig. 3B fig. 4 fig. 5

GENERATING A COMMON SYMBOL TABLE FOR SYMBOLS OF INDEPENDENT APPLICATIONS

CROSS-REFERENCE TO RELATED APPLICATIONS

This application contains subject matter which is related to the subject matter of the following applications, each of which is assigned to the same assignee as this application and filed on the same day as this application. Each of the below listed applications is hereby incorporated herein by reference in its entirety:

"Facilitating The Use Of Aliases During The Debugging Of Applications," Baker et al., Ser. No. 10/099,849, filed herewith; and "Facilitating the Debugging of Applications By Employing User Defined or Redefined Symbols," Baker et al., Ser. No. 10/099,286, filed herewith.

TECHNICAL FIELD

This invention relates, in general, to processing within a computing environment, and in particular, to the generating of symbol tables used during, for instance, the debugging of computer applications.

BACKGROUND OF THE INVENTION

Computer applications are created using programming languages. These programming languages include human-readable text, which is translated by a compiler to generate machine-readable instructions. In particular, the compiler translates each line of the programming language into a sequence of machine-readable instructions, which perform the logical task described by the line of programming language code.

During the course of programming, errors may occur due to programmer error. These errors include either syntax errors or logic errors. Syntax errors are caught by the compiler, which refuses to generate machine instructions for a line of programming language that it does not understand. Logic errors are caught by detecting that the program does not perform as expected, often resulting in program exceptions or incorrect behavior. While syntax errors can be corrected by determining the correct syntax, logic errors are often much more difficult to ascertain. For this reason, a special class of computer programs has been developed. These programs are called debuggers. One example of a debugger is described in U.S. Pat. No. 4,636,940, entitled "Logic Analyzer Using Source Programs Or Other User Defined Symbols In The Trace Specification And The Trace Listing", issued Jan. 13, 1987, which is hereby incorporated herein by reference in its entirety. A debugger allows the user to trace through the users' own program, while it is executing on the computer, to determine the instance or instances where the logical flow of the program is incorrectly designed.

A debugger uses debugging information to debug the state of variables at runtime. This debugging information is generated by the compiler and describes how the variables of the application are stored and what fields the variables contain. One example of a technique used by a compiler to generate this debugging information is described in U.S. Pat. No. 5,715,460, entitled "Template Based Facility For Formatting Compiler Output", issued Feb. 3, 1998, which is hereby incorporated herein by reference in its entirety.

The amount of space required to store the debugging information can become large, particularly if a large number of variables are used or if the variables contain a large number of fields. When many programs are compiled with debugging information, the storage size required to keep these applications in a debuggable state can become onerous. The ability to reduce the amount of space used to store the debugging information is, therefore, desirable.

Several techniques have been employed in an effort to reduce the amount of debugging information. Examples of these techniques are described in, for instance, U.S. Pat. No. 6,226,786, entitled "Minimizing Debug Information For Global Types In Compiled Languages", issued May 1, 2001; Japanese Patent No. JP10289109A, entitled "Compiling Control Method, Compiling Device and Recording Medium", issued Oct. 17, 1998; and U.S. Pat. No. 5,680,622, entitled "System And Methods For Quickly Detecting Shareability Of Symbol And Type Information In Header Files", issued Oct. 21, 1997, each of which is hereby incorporated herein by reference in its entirety. One or more of the techniques determine common information between application segments, which are linked or compiled together to create a single executable. The identification and use of the common information reduces the need for duplicative information, thereby reducing the amount of space used to store the debugging information.

However, a need still exists for a capability that facilitates a reduction in the amount of debugging information, and therefore, the amount of storage space, when applications are independent of one another. In particular, a need exists for the determination of common information for applications that are not linked, compiled or integrated with one another.

SUMMARY OF THE INVENTION

The shortcomings of the prior art are overcome and additional advantages are provided through the provision of a method of generating a symbol table. The method includes, for instance, obtaining a plurality of symbols of a plurality of independent applications; and including the plurality of symbols in a common symbol table.

In a further aspect of the present invention, a method of generating a common symbol table is provided. The method includes, for instance, inputting information associated with one or more common symbols in a common symbol table external to a plurality of independent applications, the one or more common symbols corresponding to the plurality of independent applications; and creating at least one stub usable in locating at least one common symbol of the one or more common symbols of the common symbol table.

System and computer program products corresponding to the above-summarized methods are also described and claimed herein.

Advantageously, a capability is provided that reduces the amount of debugging information for applications that are not linked, compiled or integrated with one another. A common symbol table that is placed in a common location includes the common symbols for a plurality of independent applications. This reduces the size of the applications and the amount of storage space required to include the common symbol information and reduces the resources required for each individual application.

Additional features and advantages are realized through the techniques of the present invention. Other embodiments and aspects of the invention are described in detail herein and are considered a part of the claimed invention.

BRIEF DESCRIPTION OF THE DRAWINGS

The subject matter which is regarded as the invention is particularly pointed out and distinctly claimed in the claims at the conclusion of the specification. The foregoing and other objects, features, and advantages of the invention are apparent from the following detailed description taken in conjunction with the accompanying drawings in which:

BEST MODE FOR CARRYING OUT THE INVENTION

In one aspect of the present invention, a capability is provided for generating a common symbol table that is to include symbols of a plurality of independent applications. The applications are independent in that they need not be linked, compiled or integrated together. Instead, the applications can be disjoint or unrelated. The common symbol table is located, for instance, in a common or global location, such as in common storage of a computing environment, which is accessible by the independent applications.

Figure 1A:
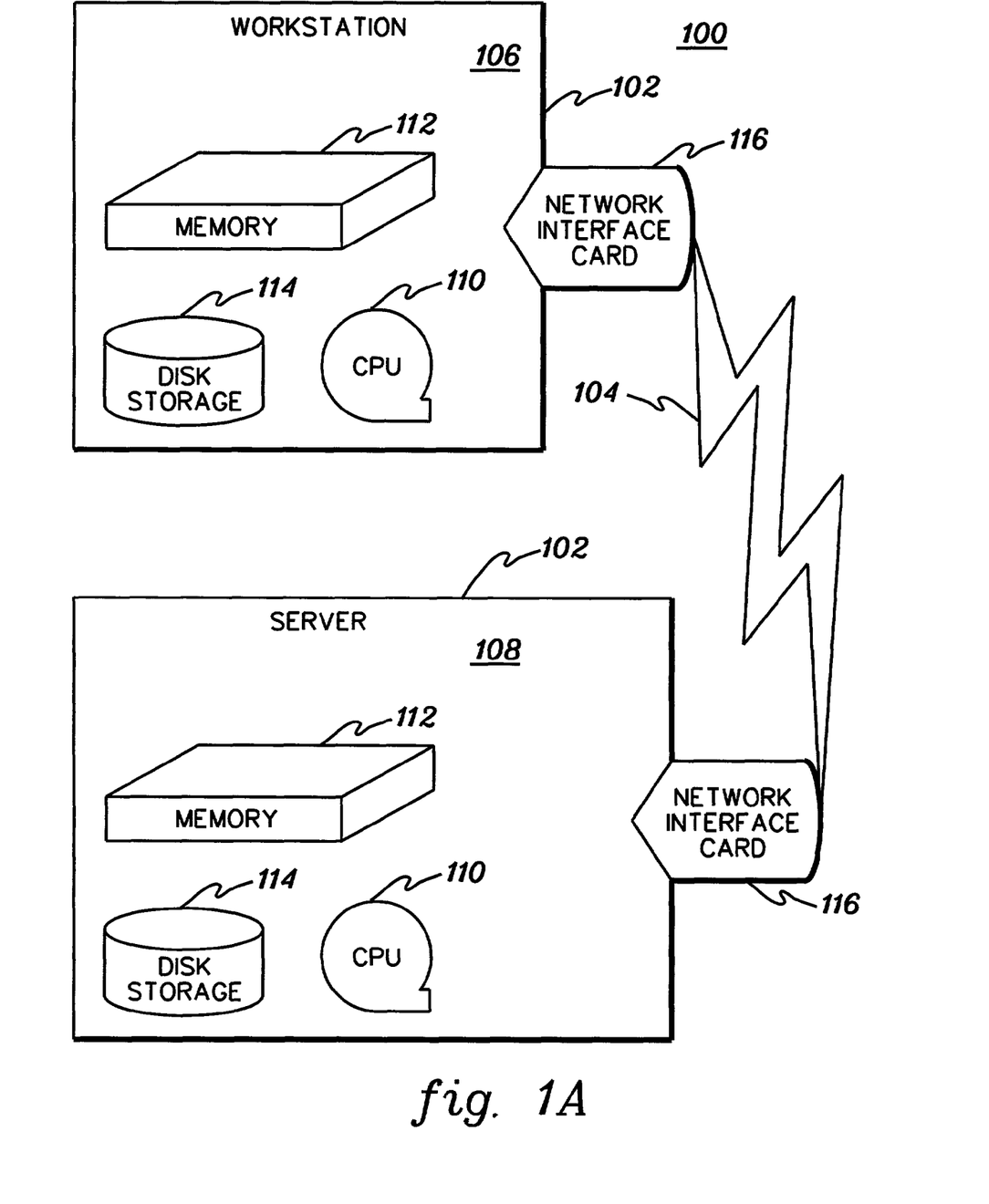
FIG. 1a depicts one embodiment of a computing environment incorporating and using one or more aspects of the present invention.

One embodiment of a computing environment incorporating and using one or more aspects of the present invention is depicted in FIG. 1a. A computing environment 100 includes, for instance, a plurality of computing units 102 coupled to one another via a connection 104. In one example, one of the computing units is a workstation 106 executing an operating system, such as Windows NT or LINUX, as examples, and the other computing unit is a server 108 executing the z/OS or OS/390 operating system offered by International Business Machines Corporation, Armonk, N.Y. Each computing unit includes, for example, a central processing unit (CPU) 110, memory 112, and one or more input/output devices 114, which are well known in the art.

Connection 104 is, for instance, a TCP/IP connection, which includes a network interface card 116 at each end. In other embodiments, however, connection 104 may be any type of connection, such as a wire connection, token ring or network connection, to name just a few examples.

The computing environment described above is only one example. One or more aspects of the present invention can be incorporated and used with other types of computing units, computers, processors, nodes, systems, workstations and/or other environments, without departing from the spirit of the present invention.

For example, aspects of the present invention can be used in a single system environment. One such environment may include, for instance, an RS/6000 computer system running the AIX operating system offered by International Business Machines Corporation, Armonk, N.Y. In yet a further embodiment, one or more aspects of the invention can be included in a large parallel system with a plurality of units coupled to one another. These and many other types of environments are capable of incorporating and using aspects of the present invention.

Figure 1B:
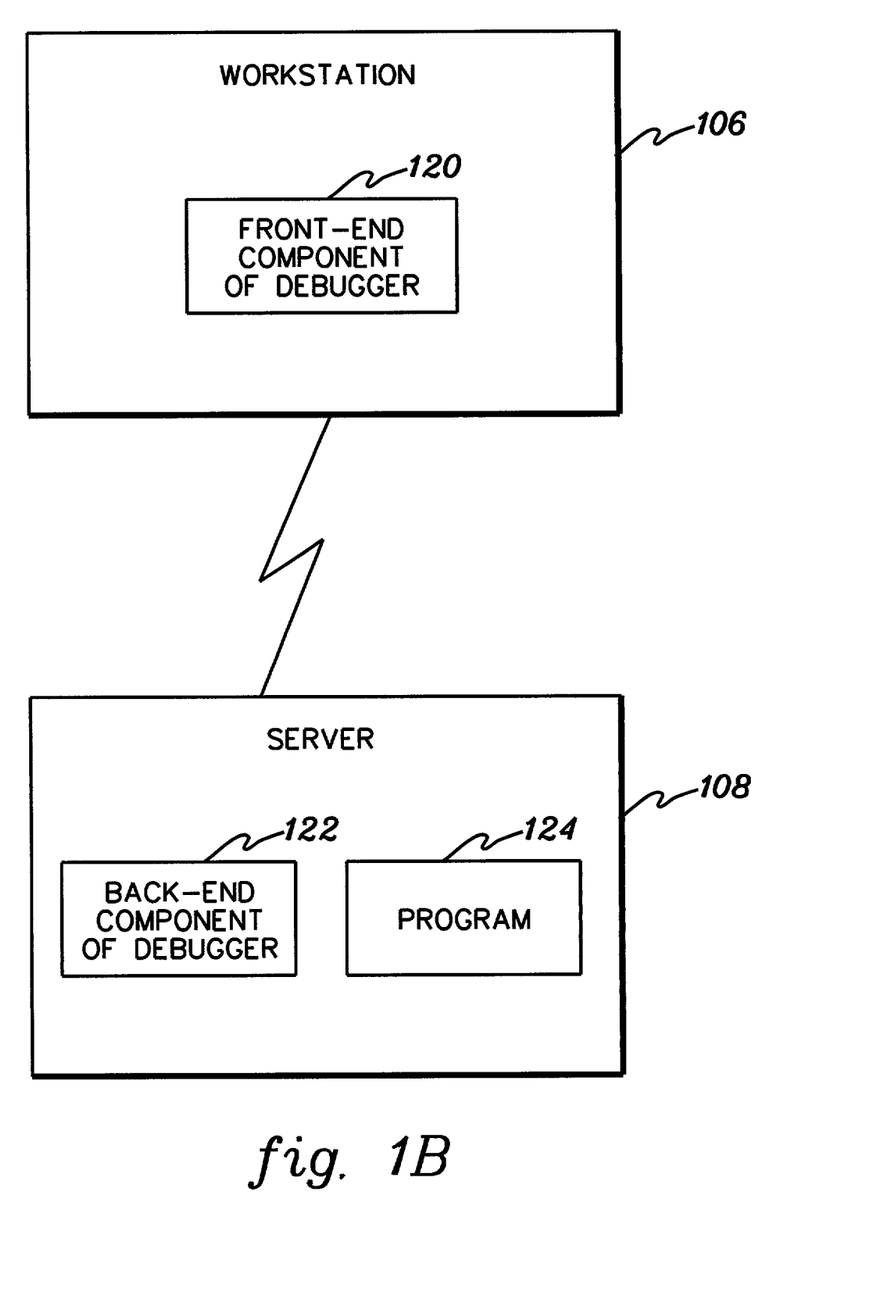
FIG. 1b depicts one embodiment of a distributed debugger executing within the computing environment of FIG. 1a, in accordance with an aspect of the present invention.

In one embodiment, executing within the computing environment is a debugger. As one example, this debugger is a distributed debugger, in which components of the debugger are run on the various computing units. For example, as shown in FIG. 1b, a front-end component 120 of a debugger is executing on workstation 106 and a back-end component 122 of the debugger is executing on server 108. The front-end component includes a user interface to facilitate user input to the debugger; and the back-end component includes the logic used in performing the debugging of a user's program 124 running on server 108. One example of such a distributed debugger is the IBM distributed debugger.

Although a distributed debugger is described herein, the capabilities of the present invention are not limited to such a debugger. Non-distributed debuggers may also be used. For example, one or more aspects of the present invention can be incorporated and used in a single system environment using a non-distributed debugger.

A debugger is used during the process of software development to detect one or more errors of a developing application. In order to debug an application, debugging information is employed. This debugging information is provided by the compiler, when a debugging option is chosen. As one example, the debugging information includes symbols generated by the compiler that represent each variable or inline definition included in the application source.

A symbol describes, for instance, the location of a variable in memory at any given time that variable is active in the program. As one example, a symbol includes information about the name of a variable, the type of the variable, and the address or list of addresses for the variable. For example, if the variable int i is declared in a program, a symbol is generated for the variable. The symbol includes, for instance, information about the name (i), the type (int), and information the compiler generates about how to locate the variable.

Figure 2A:
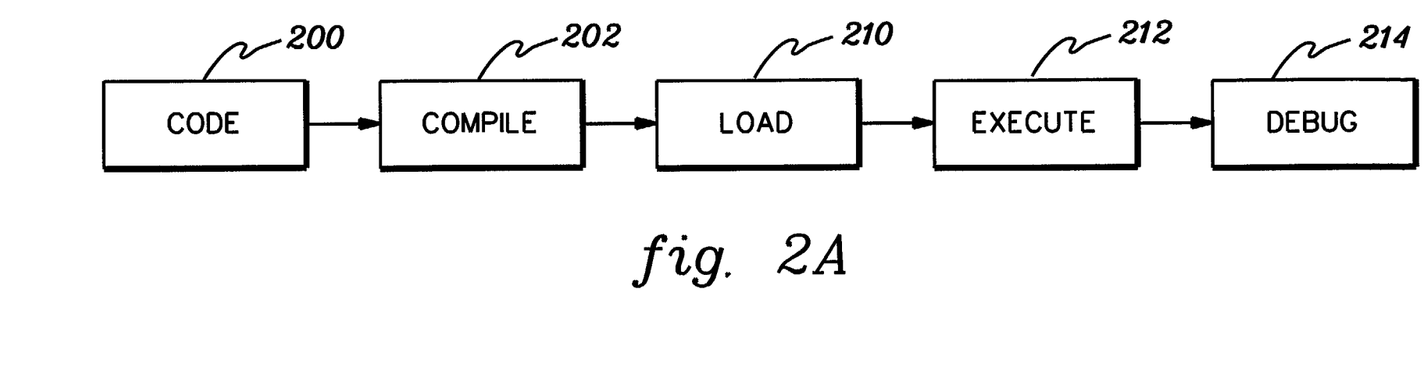
FIG. 2a depicts one embodiment of processing stages associated with developing an application.
Figure 2B:
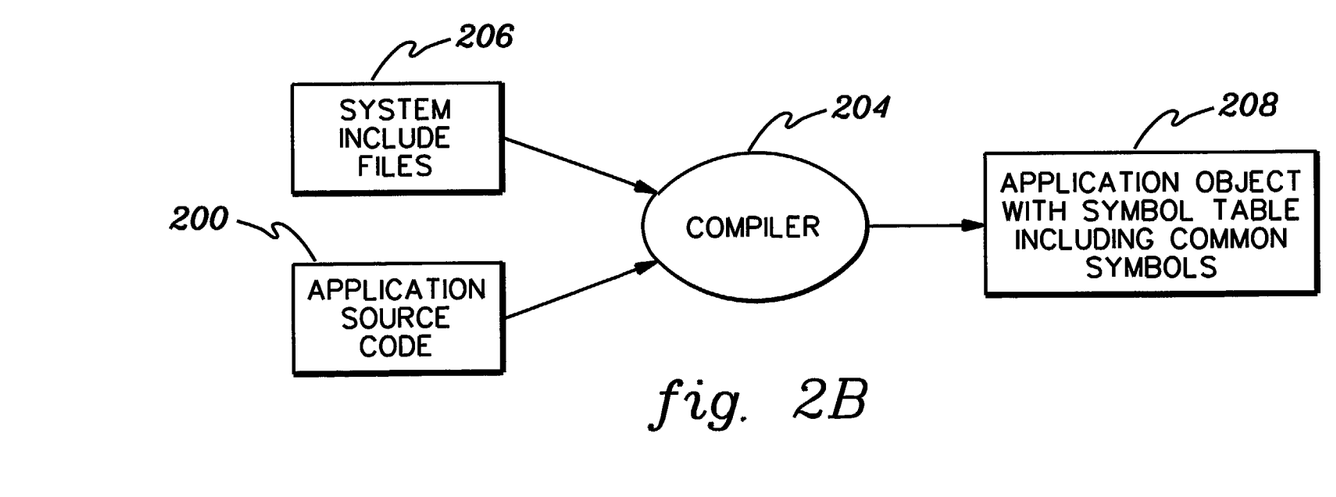
FIG. 2b depicts further details of the compilation stage of FIG. 2a, in which an application object with a local symbol table including common symbols is generated.

One example of generating debug information is described with reference to FIGS. 2a-2b. Initially, an application developer writes code 200 (e.g., source code) for an application. The source code is compiled 202 to convert the source code into one or more object modules that include machine code. For example, a compiler 204 (FIG. 2b) receives, as input, application source code 200, as well as zero or more system include files 206 that are referenced in the source code. The compiler compiles this information producing at least one application object 208. The application object includes, in response to the debugging option, a symbol table that includes the symbols generated for the application source code and any system include files.

Subsequent to compilation, the object modules are loaded 210 (FIG. 2a) into memory as an executable file. Typically, preceding the loading or as part of the loading process, a linking process is performed, which combines the object modules produced during compilation (assuming more than 1) and resolves any interconnecting references of the modules to produce the executable file.

Thereafter, the application is executed 212. In one embodiment, as part of execution, the code is debugged 214 to determine if there are any errors. The debugger performing the debugging uses the debugging information (e.g., symbol table) generated by the compiler and stored locally to the application (e.g., internal to the application).

The debugging information may grow very large and cumbersome, if a large number of system include or definition files are used in the application. This causes the storage size needed to keep the application in a debuggable state to be onerous, and slows down application performance. Thus, in accordance with an aspect of the present invention, the amount of debugging information stored in the application object is reduced. This reduces the storage size required to keep the application in a debuggable state and increases the performance of the application (e.g., during compilation). In order to make this reduction, common symbols (e.g., system symbols included in include and definition files) are placed in a common location, instead of inside the application object, and the application object includes references to those common symbols. Since the common symbol information is separated from the local application information and placed in a common location, the average size of an application program is reduced by a significant percentage.

Figure 3A:
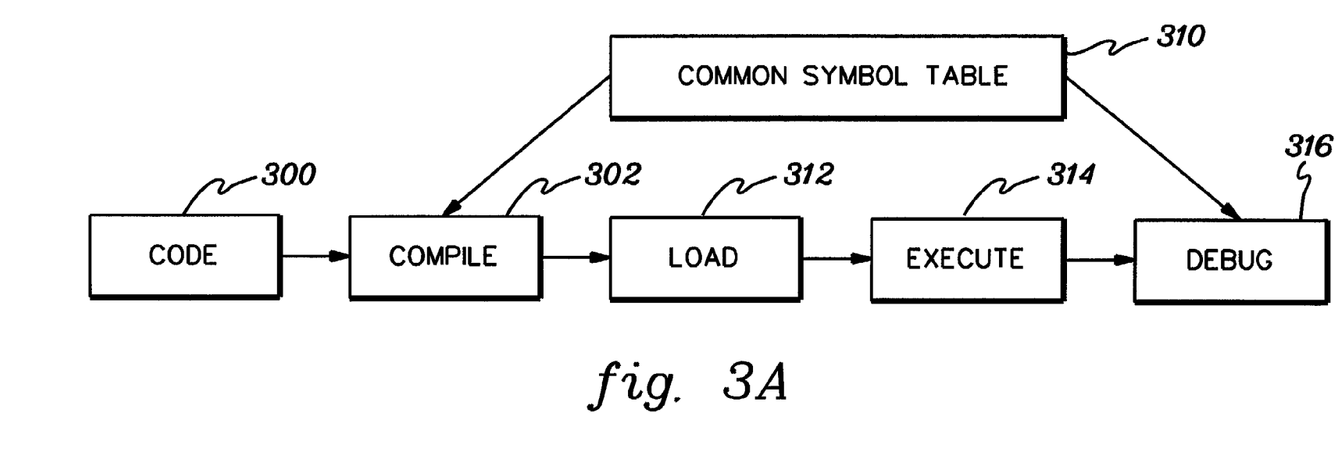
FIG. 3a depicts one embodiment of processing stages associated with developing an application, in accordance with an aspect of the present invention.
Figure 3B:
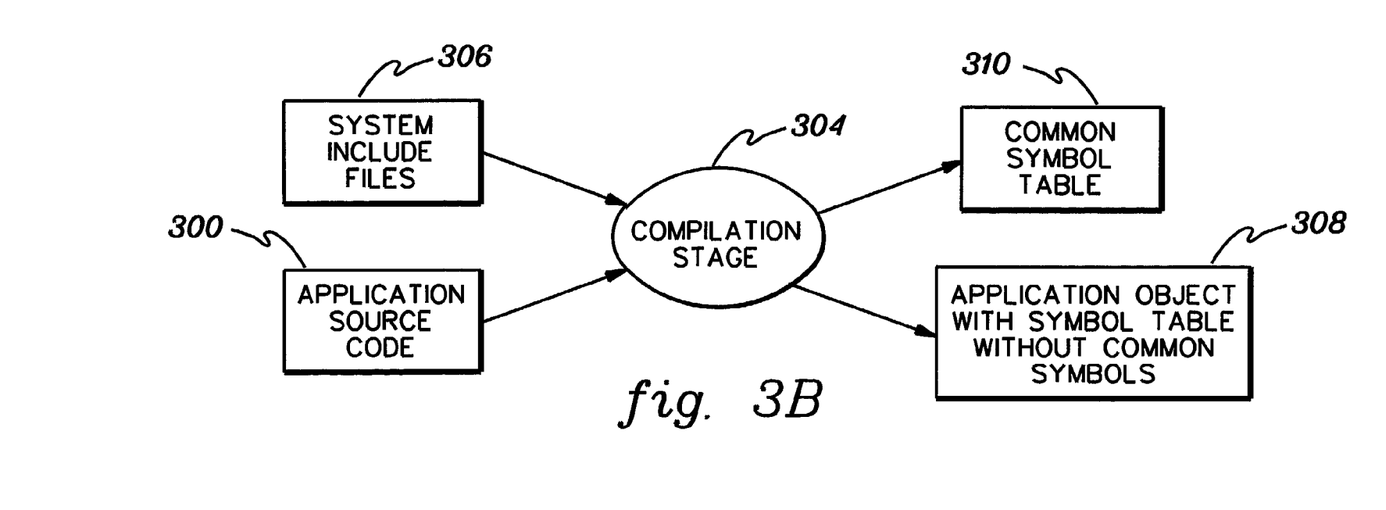
FIG. 3b depicts further details of the compilation stage of FIG. 3a, in which an application object with a local symbol table having no common symbols is generated, along with a common symbol table, in accordance with an aspect of the present invention.

One embodiment of the logic associated with providing separate common symbols is described with reference to FIGS. 3a-3b. As before, an application developer writes code 300 for an application. The source code is compiled 302 to convert the source code into one or more object modules that include machine code. For example, a compiler, during a compilation stage 304 (FIG. 3b), receives, as input, application source code 300, as well as zero or more system include files 306 that are referenced in the source code. The compiler compiles this information producing at least one application object 308. The application object 308 then undergoes further compilation processing, in accordance with an aspect of the present invention. For example, common symbols, if any, and information associated therewith are removed from the application object, by, for instance, a program, and placed in at least one common symbol table 310. The common symbol table enables the bulky symbol information associated with the common symbols previously stored in the application object to be replaced with symbol stubs pointing to the external common table, if necessary or desired.

Subsequent to compilation, the one or more application objects are (linked and) loaded 312 (FIG. 3a) as an executable file and executed 314. As part of execution, the application is debugged 316 by a debugger. The debugger employs the common symbol table, as well as the symbol table within the application (i.e., the local or internal table). Further details regarding the common symbol table are described below.

The common symbol table is used to merge common information used by different programs into a common location. In one example, the common symbol table has the same format as the debugging information generated by the compiler. This enables the debugger to use the same access method to look up the information. The common symbol table may be created incrementally or generated once. Using an incremental approach, the common symbol table may grow with each run of the compiler, if additional system include files or other files having common symbols are encountered. In a different approach, the common symbol table is created once from a predefined selection of system include files and/or other files. Variations of the two approaches are also possible.

Symbols which have been determined or specified as common symbols (e.g., system symbols) are not maintained within the local symbol table, but instead are placed in the common symbol table. However, to locate the symbols in the common symbol table, stubs, which are included in the local table, are employed. Each stub includes some information (e.g., symbol name) about the symbol, but much less information than typically included in the table (e.g., no type information). For example, for the following C structure:

```
struct mystruct {
    int a;
    int b;
    int c;
} thisvar;
``` the stub would include:
  name: thisvar
  stub: mystruct
  flag: is_stub
  location: base address for thisvar.

Symbols can be indicated as common symbols through various techniques. For example, symbols generated from system header files are considered common symbols. Further, a particular command can be used to indicate common symbols. For instance, an application developer can use a pragma command in the source to indicate specific variables or types as common symbols. In the following example, the symbols "a_common_symbol" and "another_common_symbol", and the type "my_common_type" are defined as common symbols:

```
#pragma comsym(a_common_symbol)
#pragma comsym(another_common_symbol)
#pragma comsym(my_common_type)
int a_common_symbol;
int another_common_symbol;
typedef struct my_struct {
    int a_struct_member;
    int b_struct_member;
} my_common_type;
```

For the above example, the compiler is to be enhanced to support #pragma comsym statements.

When the debugger loads the symbol information and detects a stub, the debugger looks up the symbol name in the common symbol table and attaches the type information in the common symbol table to the remainder of the symbol. This allows multiple programs to share entries within the common symbol table, thus saving space needed to store the debugging information. In addition to saving space, this capability allows faster initialization of the debugger, as the common symbols are loaded once (in one example), and then persist in memory, usable by multiple programs. If a program does not contain any common symbols, the performance is not affected. If a program does contain common symbols, the performance is improved, as the load time required to search through debugging information is decreased due to its smaller size.

Figure 4:
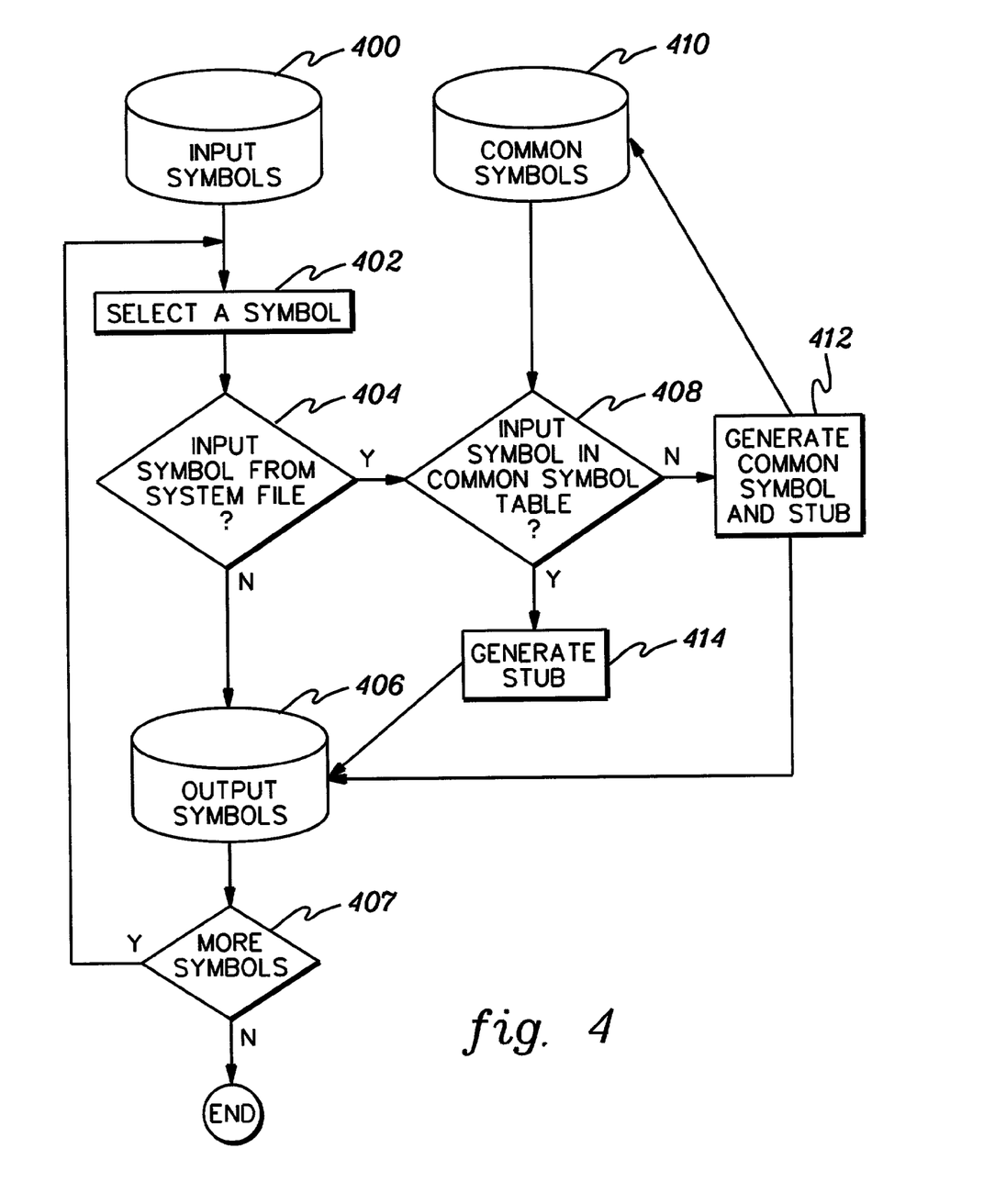
FIG. 4 depicts one embodiment of the logic associated with generating a common symbol table, in accordance with an aspect of the present invention.
Figure 5:
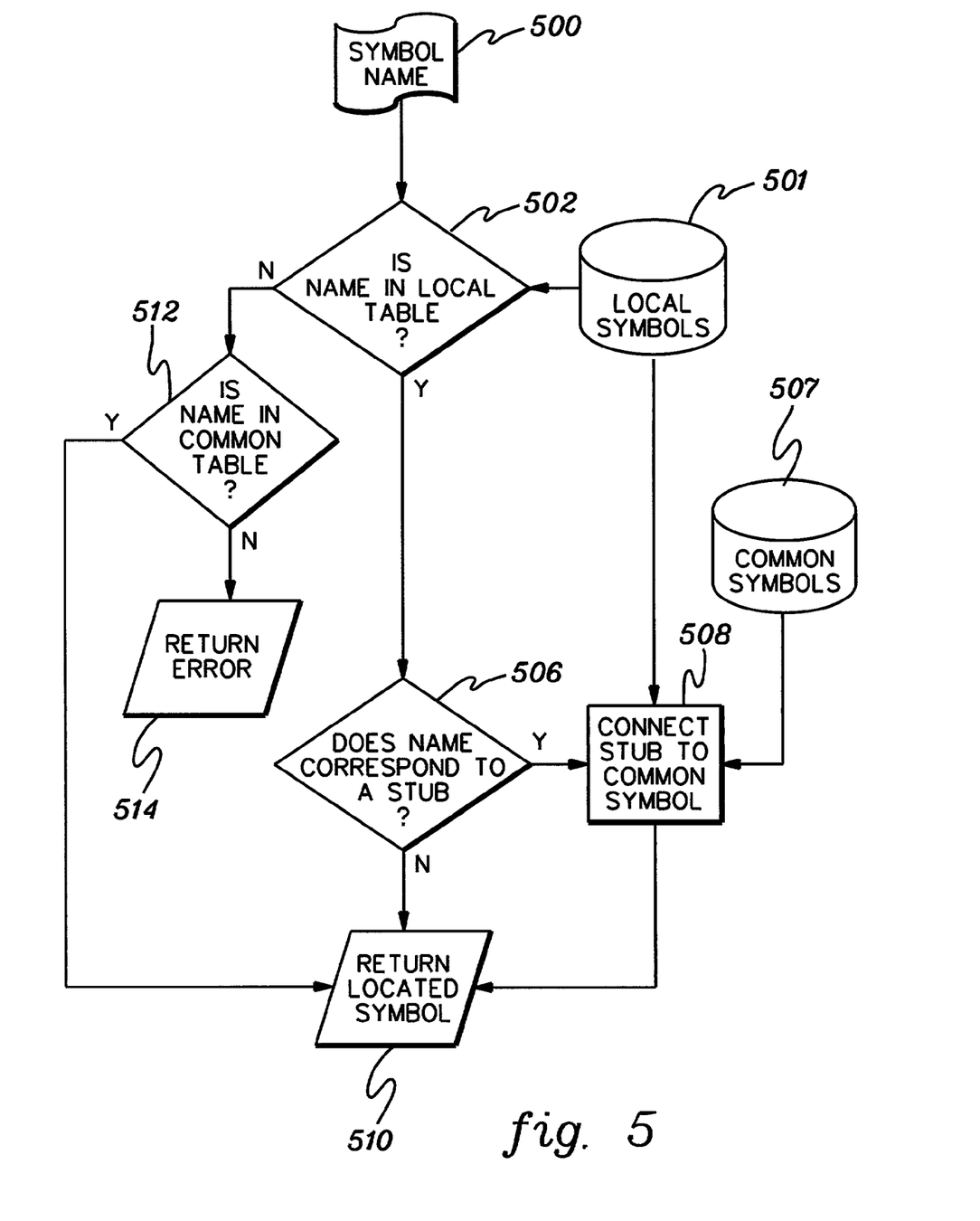
FIG. 5 depicts one embodiment of the logic associated with utilizing a common symbol table, in accordance with an aspect of the present invention.

In order to provide the common symbol table, changes are made, in one aspect of the present invention, to the compilation stage of processing, as well as to the debugging stage. These changes are described with reference to FIGS. 4-5. In particular, FIG. 4 depicts one embodiment of the logic associated with generating the common symbol table; and FIG. 5 depicts one embodiment of the logic associated with using the common symbol table. In one example, the logic of FIG. 4 is performed by a program separate from the compiler, but the processing is part of the compilation stage. In an other example, the logic is part of the compiler.

Referring to FIG. 4, one or more symbols 400 generated during the compilation stage are input to the logic. A symbol is selected from the input, STEP 402, and a determination is made as to whether the selected input symbol is from a system file, INQUIRY 404. That is, a determination is made as to whether the symbol is a common symbol. If the symbol is not from a system file, then the symbol is output to a local system table 406. As one example, it is output to the symbol table internal to the application corresponding to the symbol. Then, a determination is made as to whether there are more symbols to be processed, INQUIRY 407. If there are more symbols to be processed, then processing continues with STEP 402. Otherwise, generation of the common symbol table is complete.

Returning to INQUIRY 404, should the symbol be from a system file, then a further determination is made as to whether the input symbol is already in the common symbol table, INQUIRY 408. In one example, this determination is made by looking up the symbol in common symbol table 410. If the input symbol is not in the common symbol table, then the common symbol is placed in the common symbol table and a stub is created, STEP 412. For instance, the bulk of the symbol information (e.g., the type information) is removed from the appropriate local table (i.e., the internal table of the application corresponding to the symbol) and placed in the common table. Further, a stub is placed in the local table 406 to be used in locating the symbol. The stub includes a minimal amount of information.

Returning to INQUIRY 408, if the input symbol is in the common symbol table, then a stub, if needed, is generated for the symbol, STEP 414. In some examples, a stub may not be needed, and thus, is excluded. For instance, if the stub is not necessary to determine the location of the symbol at application execution time, then it is excluded. As one example, #define MY_CONST3 does not need a stub. Instead, the symbol is simply placed in the common symbol table.

Further, if the name already exists in the common symbol table, but the type generated by the compiler does not match the type located in the common symbol table, then the compiler does not remove the debugging information, as this would result in the wrong type being generated for the variable at debug time.

Subsequent to placing the appropriate information in the internal symbol table, processing continues with INQUIRY 407. At the completion of processing, a common symbol table has been created by removing the bulky information from the local tables and placing in its stead, one or more stubs, if desired.

Although in the above embodiment the check for common symbols includes a check of system files, in other embodiments, the check for common symbols may include looking for other types of files or by other processing. Moreover, although in the above embodiment common information is originally placed in local tables and then removed, in other embodiments other techniques may be employed. For instance, the information may not be placed in a local table, but may be placed directly in the common table or elsewhere. Other variations are also possible.

During the debugging process, the common symbol table is utilized as described with reference to FIG. 5. When a debugger encounters a symbol name 500, a determination is made as to whether the name is in the local table 501, INQUIRY 502. If the name is in the local table, then a further determination is made as to whether the name in the local table corresponds to a stub, INQUIRY 506. If the name corresponds to a stub, then the stub is used to locate the information relating to that symbol name in common symbol table 507, STEP 508. For instance, the location data in the stub is used to find the symbol information in the common table. That information is then combined with the stub information, and the combined information is then returned, STEP 510.

Returning to INQUIRY 506, if the name does not correspond to a stub, then the information in the local table is returned, STEP 510.

Further, returning to INQUIRY 502, if the name is not in the local table, then a further determination is made as to whether the name is in the common table, INQUIRY 512. That is, is the name in the common table, but no stub is needed. Should the name be in the common table, then the located symbol is returned, STEP 510. Otherwise, an error is returned, STEP 514.

Described in detail above is a capability for generating a common symbol table and using that common symbol table during the debugging of application code. The common symbol table includes symbols of a plurality of independent applications. By placing the bulky information associated with the symbols in the common symbol table, and therefore, outside the application code, storage associated with the application code is reduced and performance of the application is enhanced.

Although in the above embodiments, the common symbol table is used for debugging purposes, this is only one example. It is possible to generate and use a common symbol table for other purposes. Further, although the term table is utilized, the structure used to hold the common symbols is not limited to a table structure. Many types of data structures are usable, and thus, the term table includes those structures.

Further, although the embodiments herein refer to a compiler, aspects of the invention are equally applicable to an assembler environment or other like environments. Thus, the term compiler includes degenerate forms of compilers, such as assemblers and other like components.

The present invention can be included in an article of manufacture (e.g., one or more computer program products) having, for instance, computer usable media. The media has embodied therein, for instance, computer readable program code means for providing and facilitating the capabilities of the present invention. The article of manufacture can be included as a part of a computer system or sold separately.

Additionally, at least one program storage device readable by a machine, tangibly embodying at least one program of instructions executable by the machine to perform the capabilities of the present invention can be provided.

The flow diagrams depicted herein are just examples. There may be many variations to these diagrams or the steps (or operations) described therein without departing from the spirit of the invention. For instance, the steps may be performed in a differing order, or steps may be added, deleted or modified. All of these variations are considered a part of the claimed invention.

Although preferred embodiments have been depicted and described in detail herein, it will be apparent to those skilled in the relevant art that various modifications, additions, substitutions and the like can be made without departing from the spirit of the invention and these are therefore considered to be within the scope of the invention as defined in the following claims.

What is claimed is:

1. A method of generating a table of debug information, said method comprising:

obtaining, by a processor, a compiled application object;
performing additional compilation processing on the compiled application object, the compiled application object comprising a local debug symbol table to be included into an executable application generated from the compiled application object, the processing to remove one or more common symbols from the local debug symbol table, to reduce an amount of debugging information stored in the local debug symbol table and to reduce the size of the executable application generated from the compiled application object, wherein the performing comprises:
selecting a debug symbol within the compiled application object;
determining whether the debug symbol is a common symbol based on one or more pre-determined rules of what types of debug symbols are considered common symbols;
checking, based on the determining indicating the debug symbol is a common symbol, whether the debug symbol is in a common debug symbol table used for debugging applications, the common debug symbol table being separate from the local debug symbol table, wherein the common debug symbol table is maintained external from the compiled application object and from the executable application generated from the compiled application object, and wherein the common debug symbol table is within a global location accessible by a plurality of independent applications, the plurality of independent applications comprising the executable application generated from the compiled application object;
removing the debug symbol from the local debug symbol table of the compiled application object and including the debug symbol in the common debug symbol table, based on the determining indicating the debug symbol is a common symbol and the checking indicating the debug symbol is not already in the common debug symbol table, wherein the removing comprises removing information associated with the debug symbol from the local debug symbol table and based on the removing, the debug symbol and the information associated with the debug symbol are omitted from the local debug symbol table included in the executable application generated from the compiled application object, and the including comprises:
placing the information in the common debug symbol table; and
placing a stub in the local debug symbol table to facilitate locating the information in the common debug symbol table during execution of the executable application.

2. The method of claim 1, wherein the common debug symbol table has a same format as debugging information generated during compilation, facilitating access by a debugger.

3. The method of claim 1, further comprising incrementally adding to the common debug symbol table based on one or more additional runs of a compiler to compile one or more additional application objects from which one or more additional executable applications, independent from the executable application, are generated.

4. The method of claim 1, wherein said determining whether the debug symbol is a common symbol comprises determining whether the debug symbol is of a system file, wherein a debug symbol of a system file is considered a common symbol to be removed from the local debug symbol table and included in the common debug symbol table.

5. The method of claim 1, wherein said determining whether the debug symbol is a common symbol comprises determining whether a command indicates the debug symbol is a common symbol.

6. The method of claim 1, further comprising using said common debug symbol table to debug the executable application generated from the compiled application object.

7. The method of claim 6, wherein said using comprises:
encountering a debug symbol during debugging of the executable application;
determining whether a name of the debug symbol is included in the local debug symbol table included in the executable application;
checking whether the name corresponds to a stub, based on the determining indicating the name is in the local debug symbol table; and
based on the checking indicating the name corresponds to a stub, using the stub to locate information relating to the debug symbol in the common debug symbol table.

8. The method of claim 1, wherein the executable application is independent of other executable applications, of the plurality of independent applications, that have debug symbols in the common debug symbol table, wherein the executable application is not linked or compiled with the other executable applications.

9. The method of claim 1, wherein the local debug symbol table is included into the executable application for debug purposes, wherein the stub placed in the local debug symbol table facilitates locating the information in the common debug symbol table when debugging the executable application during execution thereof.

10. A computer program product for generating a table of debug information, said computer program product comprising:
a non-transitory computer readable storage medium readable by a processing circuit and storing instructions for execution by the processing circuit for performing a method comprising:
obtaining, by a processor, a compiled application object;
performing additional compilation processing on the compiled application object, the compiled application object comprising a local debug symbol table to be included into an executable application generated from the compiled application object, the processing to remove one or more common symbols from the local debug symbol table, to reduce an amount of debugging information stored in the local debug symbol table and to reduce the size of the executable application generated from the compiled application object, wherein the performing comprises:
selecting a debug symbol within the compiled application object;
determining whether the debug symbol is a common symbol based on one or more pre-determined rules of what types of debug symbols are considered common symbols;
checking, based on the determining indicating the debug symbol is a common symbol, whether the debug symbol is in a common debug symbol table used for debugging applications, the common debug symbol table being separate from the local debug symbol table, wherein the common debug symbol table is maintained external from the compiled application object and from the executable application generated from the compiled application object, and wherein the common debug symbol table is within a global location accessible by a plurality of independent applications, the plurality of independent applications comprising the executable application generated from the compiled application object;

removing the debug symbol from the local debug symbol table of the compiled application object and including the debug symbol in the common debug symbol table, based on the determining indicating the debug symbol is a common symbol and the checking indicating the debug symbol is not already in the common debug symbol table, wherein the removing comprises removing information associated with the debug symbol from the local debug symbol table and based on the removing, the debug symbol and the information associated with the debug symbol are omitted from the local debug-symbol table included in the executable application generated from the compiled application object, and the including comprises:
  placing the information in the common debug symbol table; and
  placing a stub in the local debug symbol table to facilitate locating the information in the common debug symbol table during execution of the executable application.

11. The computer program product of claim 10, wherein the common debug symbol table has a same format as debugging information generated during compilation, facilitating access by a debugger.

12. The computer program product of claim 10, wherein the method further comprises incrementally adding to the common debug symbol table based on one or more additional runs of a compiler to compile one or more additional application objects from which one or more additional executable applications, independent from the executable application, are generated.

13. The computer program product of claim 10, wherein said determining whether the debug symbol is a common symbol comprises determining (i) whether the debug symbol is of a system file, wherein a debug symbol of a system file is considered a common symbol to be removed from the local debug symbol table and included in the common debug symbol table, or (ii) whether a command indicates the debug symbol is a common symbol.

14. The computer program product of claim 10, wherein the executable application is independent of other executable applications, of the plurality of independent applications, that have debug symbols in the common debug symbol table, wherein the executable application is not linked or compiled with the other executable applications.

15. The computer program product of claim 10, wherein the local debug symbol table is included into the executable application for debug purposes, wherein the stub placed in the local debug symbol table facilitates locating the information in the common debug symbol table when debugging the executable application during execution thereof.

16. A computer system for generating a table of debug information, said computer system comprising:
  a memory; and
  a processor in communications with the memory, wherein the computer system is configured to perform a method, said method comprising:
    obtaining, by a processor, a compiled application object;
    performing additional compilation processing on the compiled application object, the compiled application object comprising a local debug symbol table to be included into an executable application generated from the compiled application object, the processing to remove one or more common symbols from the local debug symbol table, to reduce an amount of debugging information stored in the local debug symbol table and to reduce the size of the executable application generated from the compiled application object, wherein the performing comprises:
      selecting a debug symbol within the compiled application object;
      determining whether the debug symbol is a common symbol based on one or more pre-determined rules of what types of debug symbols are considered common symbols;
      checking, based on the determining indicating the debug symbol is a common symbol, whether the debug symbol is in a common debug symbol table used for debugging applications, the common debug symbol table being separate from the local debug symbol table, wherein the common debug symbol table is maintained external from the compiled application object and from the executable application generated from the compiled application object, and wherein the common debug symbol table is within a global location accessible by a plurality of independent applications, the plurality of independent applications comprising the executable application generated from the compiled application object;
      removing the debug symbol from the local debug symbol table of the compiled application object and including the debug symbol in the common debug symbol table, based on the determining indicating the debug symbol is a common symbol and the checking indicating the debug symbol is not already in the common debug symbol table, wherein the removing comprises removing information associated with the debug symbol from the local debug symbol table and based on the removing, the debug symbol and the information associated with the debug symbol are omitted from the local debug symbol table included in the executable application generated from the complied application object, and the including comprises:
        placing the information in the common debug symbol table; and
        placing a stub in the local debug symbol table to facilitate locating the information in the common debug symbol table during execution of the executable application.

17. The computer system of claim 16, wherein the common debug symbol table has a same format as debugging information generated during compilation, facilitating access by a debugger.

18. The computer system of claim 16, wherein the method further comprises incrementally adding to the common debug symbol table based on one or more additional runs of a compiler to compile one or more additional application objects from which one or more additional executable applications, independent from the executable application, are generated.

19. The computer system of claim 16, wherein said determining whether the debug symbol is a common symbol comprises determining (i) whether the debug symbol is of a system file, wherein a debug symbol of a system file is considered a common symbol to be removed from the local debug symbol table and included in the common debug symbol table, or (ii) whether a command indicates the debug symbol is a common symbol.

20. The computer system of claim 16, wherein the executable application is independent of other executable applications, of the plurality of independent applications, that have debug symbols in the common debug symbol table, wherein the executable application is not linked or compiled with the other executable applications.

21. The computer system of claim 16, wherein the local debug symbol table is included into the executable application for debug purposes, wherein the stub placed in the local debug symbol table facilitates locating the information in the common debug symbol table when debugging the executable application during execution thereof.

* * * * *